United States Patent [19]
Hyll

[11] Patent Number: 6,005,893
[45] Date of Patent: Dec. 21, 1999

[54] REDUCED COMPLEXITY BIT ALLOCATION TO SUBCHANNELS IN A MULTI-CARRIER, HIGH SPEED DATA TRANSMISSION SYSTEM

[75] Inventor: Mattias Hyll, Stockholm, Sweden

[73] Assignee: Telefonaktiebolaget LM Ericsson, Stockholm, Sweden

[21] Appl. No.: 08/935,529

[22] Filed: Sep. 23, 1997

[51] Int. Cl.[6] .............................. H04K 1/10; H04L 27/28
[52] U.S. Cl. ...................... 375/260; 370/468; 375/240
[58] Field of Search ................................. 375/260, 259, 375/285, 377, 224, 227, 240, 264; 370/464, 468, 241, 252, 333, 442, 480; 371/5.1, 5.5; 455/59; 714/704, 708

[56] References Cited

U.S. PATENT DOCUMENTS

| | | |
|---|---|---|
| 5,479,447 | 12/1995 | Chow et al. . |
| 5,497,398 | 3/1996 | Tzannes et al. . |
| 5,519,730 | 5/1996 | Jasper et al. . |
| 5,613,035 | 3/1997 | Kim ...................................... 395/2.38 |
| 5,627,937 | 5/1997 | Kim ...................................... 395/2.38 |
| 5,812,599 | 9/1998 | Van Kerckhove ...................... 375/260 |
| 5,852,633 | 12/1998 | Levin et al. ............................ 375/260 |

FOREIGN PATENT DOCUMENTS

| | | |
|---|---|---|
| 0 224 556 B1 | 10/1991 | European Pat. Off. . |
| 0 753 947 | 1/1997 | European Pat. Off. . |
| 0 753 948 | 1/1997 | European Pat. Off. . |
| 196 07 207 A1 | 8/1997 | Germany . |
| 2 300 546 | 11/1996 | United Kingdom . |

OTHER PUBLICATIONS

*IEEE Communications Magazine*, May 1990, pp. 5–14, John A.C. Bingham, "Multicarrier Modulation for Data Transmission: An Idea Whose Time Has Come".

*IEEE Transactions on Communications*, vol. 43, No. 2/3/4, Feb./Mar./Apr. 1995, pp. 773–775, Peter S. Chow et al, "A Practical Discrete Multitone Transceiver Loading Algorithm for Data Transmission over Spectrally Shaped Channels".

*Primary Examiner*—Chi H. Pham
*Assistant Examiner*—Jean B Corrielus
*Attorney, Agent, or Firm*—Nixon & Vanderhye P.C.

[57] ABSTRACT

A communications system employing the Discrete Multitone (DMT) line code divides the used frequency band W into a large number of subchannels, each with a bandwidth $\Delta f = W/N$. The signal in each subchannel is independently modulated at the symbol rate $1/\Delta f$. Because of noise and the non-ideal characteristics of the transmission channel, the signal-to-noise ratio (SNR) varies for different subchannels across the frequency band. Each subchannel is used to transmit an integer number of bits in a two-dimensional signal constellation, the susceptibility to noise increasing with the size of the constellation assuming that the same signal energy is used. In order to use the transmission channel optimally, subchannels are assigned different numbers of bits depending on their specific SNR values, i.e., a subchannel with a high SNR value is assigned a large number of bits and vice versa. An optimal bit allocation is determined that ensures a certain bit error rate (BER) is obtained for all subchannels. In order to simplify numerical computations, thresholding is employed to make initial bit assignments. Further simplification of the bit loading procedures is obtained by ending bit allocation optimization efforts after a targeted BER is achieved.

29 Claims, 7 Drawing Sheets

Fig. 8

| THRESHOLDS | | INPUT TO ENCODER | OUTPUT FROM ENCODER |
|---|---|---|---|
| | 0 BITS | "000000000000 0" | 0 |
| 0.4375 ▶ | | MSB     LSB | |
| | 1 BITS | "000000000001 0" | 1 |
| 0.2082 ▶ | | | |
| | 2 BITS | "000000000011 0" | 2 |
| 0.1394 ▶ | | | |
| | 3 BITS | "000000000111 0" | 3 |
| 0.0876 ▶ | | | |
| | 4 BITS | "000000001111 0" | 4 |
| 0.0605 ▶ | | | |
| | 5 BITS | "000000011111 0" | 5 |
| 0.0423 ▶ | | | |
| | 6 BITS | "000000111111 0" | 6 |
| 0.0297 ▶ | | | |
| | 7 BITS | "000001111111 0" | 7 |
| 0.0167 ▶ | | | |
| | 8 BITS | "000011111111 0" | 8 |
| 0.0148 ▶ | | | |
| | 9 BITS | "000111111111 0" | 9 |
| 0.0104 ▶ | | | |
| | 10 BITS | "001111111111 0" | 10 |
| 0.0074 ▶ | | | |
| | 11 BITS | "011111111111 0" | 11 |
| 0.0052 ▶ | | | |
| | 12 BITS | "111111111111 0" | 12 |

REDUCED COMPLEXITY BIT ALLOCATION TO SUBCHANNELS IN A MULTI-CARRIER, HIGH SPEED DATA TRANSMISSION SYSTEM

FIELD OF THE INVENTION

The present invention relates to multi-carrier, high speed data transmission and reception, and more particularly, to a method and system for simply and cost effectively allocating optimal bandwidth to each of the multi-carriers.

BACKGROUND OF THE INVENTION

The general principle of transmitting data by dividing it into several interleaved bit streams, and using these bit streams to modulate several carriers is well known. Modems using this principle employ what is referred to as Discrete Multitone (DMT) modulation and demodulation. These types of modems are being used or considered for use in such applications as cellular radio and High rate Digital Subscriber Lines (HDSL).

In a Discrete Multitone system, the input bit stream is first serial-to-parallel converted. The parallel output is then grouped into N groups of bits corresponding to the number of bits per symbol. Portions of bits are allocated to each DMT carrier or subchannel. The power transmitted over each subchannel corresponds to the number of bits transmitted over each DMT subchannel.

Like a single carrier system, a multicarrier data transmission system tries to maximize a data transmission or bit rate for a particular Bit Error Rate (BER) and a particular Signal to Noise Ratio (SNR). In theory, the total bit rate (transmitted over all of the sub-channels) is maximized if the bit error rates for all the subchannels are equal. The concern is how best to allocate bits to each subchannel to attain the same BER over all of the subchannels.

FIG. 1 shows an example Discrete Multitone (DMT) communication system in which the present invention may be advantageously employed. Transmitter 10 includes a serial-to-parallel converter 14, a multicarrier modulator 16, and a pretransmit processor 18. Receiver 12 includes a post channel processor 20, a multicarrier demodulator 22, and a parallel-to-serial converter 24. The transmitter and receiver are linked in this example by a digital subscriber line (DSL) or other form of communication channel 26. Serial input data at a rate of $b_{total}/T$ bits per second are grouped by converter 14 into blocks of $b_{total}$ bits for each multicarrier symbol, with a symbol period of T. The $b_{total}$ bits in each multicarrier symbol are used to modulate N separate carriers in modulator 16 with $b_i$ bits modulating the $i^{-th}$ carrier.

A preferred example embodiment uses an Inverse Discrete Fourier Transform (IDFT) during modulation to generate $N_s$ time-domain samples of a transmit signal for each block of $b_{total}$ bits, where $N_s$ is preferably equal to 2N. The corresponding multicarrier demodulator performs a Discrete Fourier Transform (DFT), where $b_i$ bits are recovered from the $i^{-th}$ carrier. As depicted in FIG. 2, the carriers or subchannels in a DMT system are spaced 1/T Hz apart across N/T Hz of the frequency band. More detailed discussion of the principles of multicarrier transmission and reception in general is given by J. A. C. Bingham in "Multicarrier Modulation for Data Transmission: An Idea Whose Time Has Come", *IEEE Communications Magazine*, Volume 28, Number 5, pp. 5–14, May 1990.

The general structure of a Discrete Multitone Modulation DMT system is illustrated in FIG. 3, where $\{X_0, X_1, \ldots, X_{N-1}\}$ are the original, complex, input data symbols, $\{x_k\}$ is the modulated data sequence (before cyclic prefix), $\{h_k\}$ is the discrete-time channel response, $\{n_k\}$ is the additive noise sequence, $\{y_k\}$ is the received sequence (after the removal of cyclic prefix), and $\{\tilde{x}_0, \tilde{x}_1, \ldots, \tilde{x}_{N-1}\}$ are the decoded, complex data symbols. The $p_i$'s and $p_i^*$'s in FIG. 3 are known as the modulating and the demodulating vectors, and preferably they are chosen to be orthonormal.

Adding the cyclic prefix is a discrete-time technique used to eliminate interblock interference (IBI) in the DMT system. The independent modulating and demodulating vectors in FIG. 3 are the IDFT and the DFT vectors, given by the following pair of relationships:

$$X_m = \frac{1}{\sqrt{2N}} \sum_{n=0}^{2N-1} x_n e^{-\frac{j2\pi nm}{2N}} \qquad (1)$$

$$x_m = \frac{1}{\sqrt{2N}} \sum_{n=0}^{2N-1} X_n e^{\frac{j2\pi nm}{2N}} \qquad (2)$$

A DMT system with N complex subchannels in the frequency domain requires a DFT size of 2N, and the forced conjugate symmetry in the frequency domain results in the desired real-valued time domain samples. In the preferred embodiment, IDFT and DFT are implemented with the well known IFFT and FFT algorithms using the approach disclosed in commonly-assigned "Method and Apparatus for Efficient Computation of Discrete Fourier Transform and Inverse Discrete Fourier Transform," U.S. patent application Ser. No. 08/887,467, (attorney docket 1410-340), filed on Jul. 2, 1997.

FIG. 4 is a more detailed block diagram showing the principal operative components of a basic DMT transmitter 30 and a basic DMT receiver 32 connected through a channel 34. Serial input data are grouped into blocks, converted to a parallel form, and appropriately encoded by an encoder 36. Each one of the N active subchannels contains a number of $b_k$ bits allocated to that subchannel. The total number of bits in a DMT symbol is therefore:

$$B_{total} = \sum_{k=1}^{N} b_k \qquad (3)$$

Each of the N bit groups is mapped by the symbol into a two-dimensional signal constellation. The relation between the number of bits in each block of bits $b_k$ and the necessary number of signal points in a constellation M is given by:

$$M_k = 2^{b_k} \qquad (4)$$

The signal points in a constellation are typically arranged in a rectangular pattern for even values of $b_k$ and a cross for odd values of $b_k$. Provided that the same signal energy is used for all constellations, the distance between neighboring signal points is reduced with increasing constellation size resulting in increased BER with the same signal-to-noise ration (SNR).

The output from the encoder is N complex numbers, one for each group of bits, which are then fed to a device that calculates the Inverse Discrete Fourier Transform (IDFT). The output is a real sequence that can be considered the superposing of N modulated orthogonal carriers spaced $\Delta f$ apart.

The parallel IFFT output is converted back to a serial data stream by a converter 40. The digital modulated data stream is cyclically prefixed, converted to analog form by a digital-to-analog converter (DAC) 42, low-pass filtered at 44, and passed through a D.C. isolating transformer 46 during pre-transmit processing to produce an analog signal transmitted over a transmission channel 34.

At the receiver end, the received analog signal is passed through a D.C. isolating transformer and low-pass filter 48, converted to digital form by an analog-to-digital converter (ADC) 50, time domain pre-equalized by a finite impulse response (FIR) filter 52 to limit the effective memory of the channel, and stripped of the cyclic prefix during post-receive processing in converter 54. The resulting digital signals are demodulated by 2N FFT operation 56 and converted to parallel frequency domain signals. Since the amplitude vs. frequency and the delay vs. frequency responses of the channel are not necessarily constant across the entire used frequency band, the received signal will differ from the transmitted signal, and the parallel inputs to the decoder 58 will differ from those parallel outputs from the encoder 36. One form of equalization used to compensate these differences is a frequency domain equalizer (FEQ) which individually adjusts for the attenuation and delay of each of the carriers immediately before the parallel frequency domain signals are passed to the decoder. The frequency domain equalized signals are appropriately decoded and converted back to a serial form by the decoder 58. Ideally, the detected output serial data from the decoder 58 is the same as the input serial data to the encoder 36.

In a conventional single-carrier digital transmission system, such as a Quadrature Amplitude Modulation (QAM) system implemented with an equalizer or a encoder, the transmission bandwidth is determined by the symbol rate and the carrier frequency of the system. Unfortunately, variable symbol rate, single-carrier systems are still impractical to implement from a complexity standpoint with today's technology, and even if they are implemented, the granularity of possible symbol rates are typically very coarse. This is a direct consequence of the fact that for a fixed data rate, the symbol rate can only change in discrete multiples of $b_{symbol}/(b_{symbol} \pm 1)$, where $b_{symbol}$ is the number of bits transmitted by each data symbol, provided that only signal constellations with integer numbers of bits are used.

Multicarrier modulation, however, offers much more flexibility in granularity because it acts on block symbols that consist of a much larger number of bits per symbol over a large number of carriers. Since different numbers of bits can be transmitted through the different carriers (subchannels), the multicarrier transceiver can control the transmission bandwidth. As a result, more data bits are transmitted through the better carriers, i.e., having a greater Signal to Noise Ratio (SNR), and less data bits are transmitted through the worse carriers, i.e., having a lower SNR as shown in FIG. 5. In this manner, optimal performance can be achieved, in terms of either maximizing total data throughput for a fixed system performance margin or maximizing overall system performance margin for a fixed target data rate under a fixed, total input power constraint and target bit-error-rate.

Various bandwidth/bit allocation optimization techniques for multicarrier modulation have been proposed for different applications. The theoretical optimal energy allocation is the well known water-pouring energy distribution as described for example in J. G. Proakis, (1995), Digital Communications $3^{rd}$ edition, McGraw-Hill, New York. Conceptually, the water pouring energy distribution model is obtained by first inverting the channel SNR curve shown in FIG. 5 in the frequency domain and then pouring the available energy into the resulting curve. The final "water level" at each particular frequency/carrier/subchannel is the optimal amount of energy to use at that particular frequency/carrier/subchannel. The number of bits transmitted by each carrier is determined by the maximum number of bits that can be supported by each carrier, given the water-pouring energy distribution and the desired bit-error-rate of each carrier. While the water-pouring technique yields the optimal bit and energy allocations, and therefore the optimal transmission bandwidth, it is typically complex and impractical to implement.

Another multicarrier bandwidth optimization technique designed for voice-band modem applications, where only constellations with an integer number of bits are used, was proposed by D. Hughes-Hartogs and described in "Ensemble Modem Structure for Imperfect Transmission Media", European Patent Number 0 224 556 B1 (published October 1991). The basic idea behind Hughes-Hartogs' algorithm is to incrementally add, one bit at a time, the amount of data to be transmitted in each multicarrier symbol until a desired data rate or power constraint is satisfied. Furthermore, this algorithm always chooses the subchannel that requires the least amount of incremental power to support an additional bit at the given desired bit-error-rate. Hughes Hartogs' algorithm, however, is typically too slow in convergence, making it especially unsuitable for applications where there are large numbers of carriers and bits to be supported by each multicarrier symbol as pointed out in P. S. Chow, J. M. Cioffi, J. A. C. Bingham, "A Practical Discrete Multitone Transceiver Loading Algorithm for Data Transmission Over Spectrally Shaped Channels," IEEE Transactions on Communications, Vol. 43, No. 2/3/4, pp. 773 775, 1995. Also, the channel response is assumed to be fixed, i.e., time-invariant after training, which is not a good assumption for many applications, e.g., mobile radio communications.

In order to achieve faster convergence at the expense of a slight performance degradation, Chow et al. proposed a three-step bit loading algorithm. First, an optimal system performance margin is found; second, convergence is guaranteed with a suboptimal loop; and third, the energy distribution is adjusted for each subchannel if the transmission system is constrained by the total transmit power.

However, Chow's bitloading algorithm requires computationally complex steps best run on a microprocessor and a number of iterative elements that may be excluded. Both requirements increase the system cost and reduce speed. The bit loading procedure in accordance with the present invention minimizes computational complexity and permits execution by specific hardware which is faster than programmed microprocessor driver solutions. Also those parts of the algorithm that are best run on a microprocessor are of such basic character that only a rudimentary, inexpensive device is necessary.

It is an object of this invention therefore to provide optimal bitloading using less computational power and at a fast rate.

SUMMARY OF THE INVENTION

Bits are allocated among subchannels in a multi-carrier modulation environment, under the constraint of a targeted bit error rate (BER) as well as a targeted number of bits per symbol. Thresholding is used to make initial bit assignments to subchannels in order to simplify numerical calculations. If the targeted BER cannot be achieved with the targeted number of bits, the overall channel is insufficient, and a higher BER or a lower transmission rate must be considered.

To further increase the efficiency of the process, a "block-reduction" step may be employed which reduces by one the number of bits allocated to each active subchannel if the total number of allocated bits exceeds the number of targeted bits by more than the number of active subchannels. Further fine tuning may also be performed.

The simplified bit allocation procedures in accordance with the present invention may be performed quite rapidly to permit adaptative allocation of bits in real time to accommodate, for example, changing channel conditions. In addition, the simplified procedures permit implementation using dedicated hardware for improved speed.

More specifically, in a multi-carrier communications system with a transmitter and a receiver linked together by a communications channel affected by noise and other channel impairments, data bits to be transmitted over the channel at a prescribed data transmission rate and bit error rate are allocated to plural subchannels. A series of thresholds is calculated for each subchannel with each threshold corresponding to a preset number of bits to be allocated to that subchannel. Each subchannel is associated with a signal constellation where bits allocated to the subchannel are mapped to signal points in the signal constellation. The subchannel thresholds are calculated based on the prescribed error rate, an average energy and size of the subchannel signal constellation. The threshold calculations need only be performed once, preferably before the transmitter/receiver is brought on-line.

Subsequently, after the transceiver is brought into operation, an error estimate such as a noise standard deviation is obtained for each subchannel. That error estimate is compared to the thresholds calculated for the subchannel. The number of bits is then allocated to each subchannel corresponding to one of the thresholds exceeded by the obtained error measurement. The error estimate comparing and obtaining procedures as well as the bit allocation may be performed in real time whenever the channel condition changes.

A determination is made whether a total number of bits allocated to all the subchannels is greater than or equal to a total target number of bits associated with the prescribed data transmission rate. If not, a decision is made whether to reduce the prescribed data transmission rate or to reduce the prescribed bit error rate. Otherwise, the number of bits allocated to one or more of the subchannels may be reduced until the total number of allocated bits is nearly equal to the total target number of bits. In particular, the number of bits to be allocated to each active subchannel may be reduced by one until the excess number of bits is less than the number of active subchannels.

When a remainder of the excess number of bits is less than the number of active subchannels, the remainder may be further reduced by reducing the number of bits allocated to selected ones of the active subchannels. Bits are subtracted based on a magnitude of a difference between the error estimate and the exceeded threshold for each active subchannel. Those active subchannels having larger difference magnitudes are selected first for the bit reduction followed by subchannels having smaller difference magnitudes.

BRIEF DESCRIPTION OF THE DRAWINGS

FIG. 8 is a diagram providing a specific example threshold and bit allocation operation based on the example configuration shown in FIG. 7;

DETAILED DESCRIPTION OF THE INVENTION

In the following description, for purposes of explanation and not limitation, specific details are set forth, such as particular hardware, applications, techniques, etc. in order to provide a thorough understanding of the present invention. However, it will be apparent to one skilled in the art that the present invention may be practiced in other embodiments that depart from these specific details. In other instances, detailed descriptions of well known methods, protocols, devices, and circuits are omitted so as not to obscure the description of the present invention with unnecessary detail.

Figure 1:
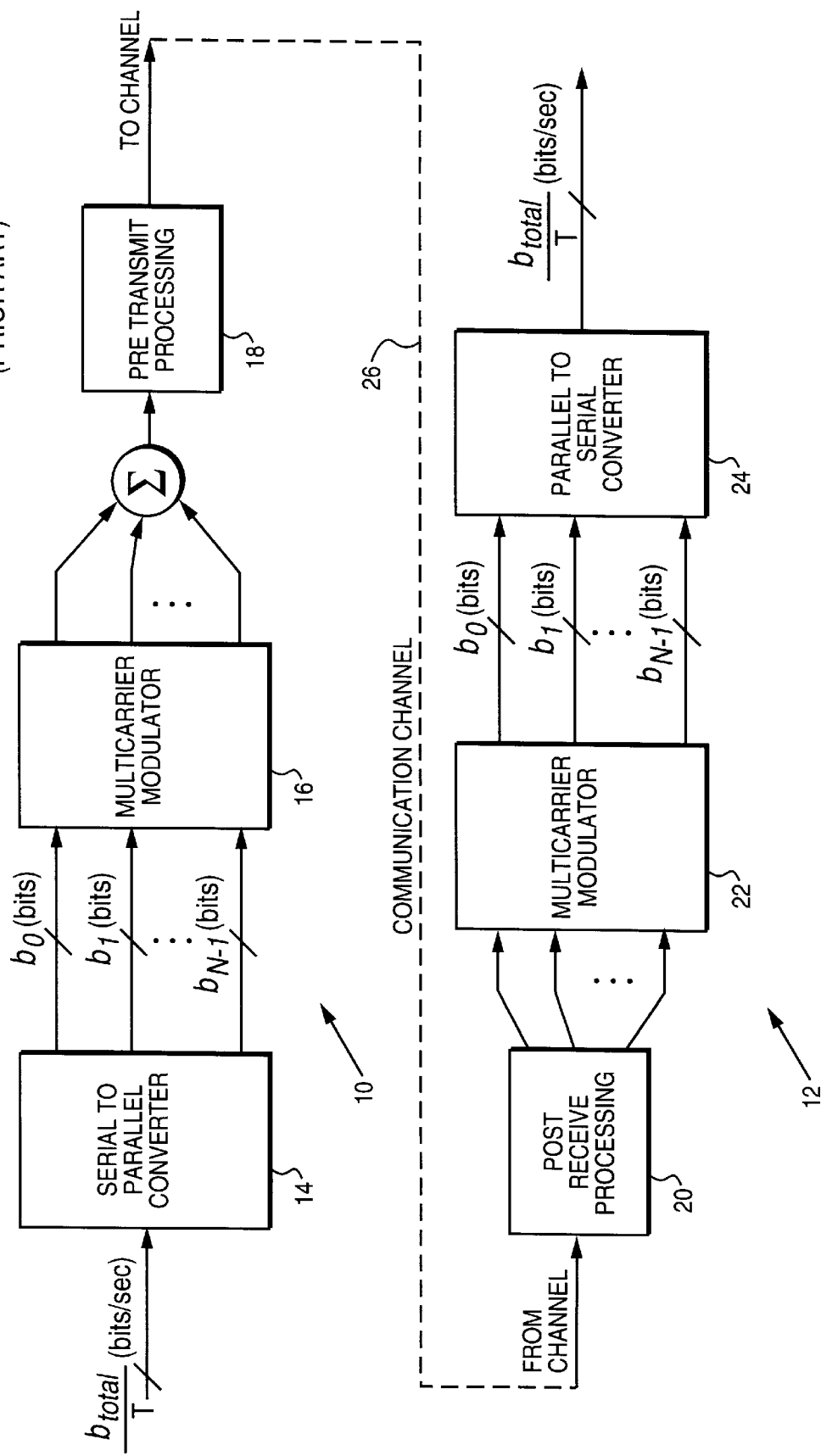
FIG. 1 is a block diagram illustrating a basic prior art multicarrier transmitter, communication channel and receiver.
Figure 2:
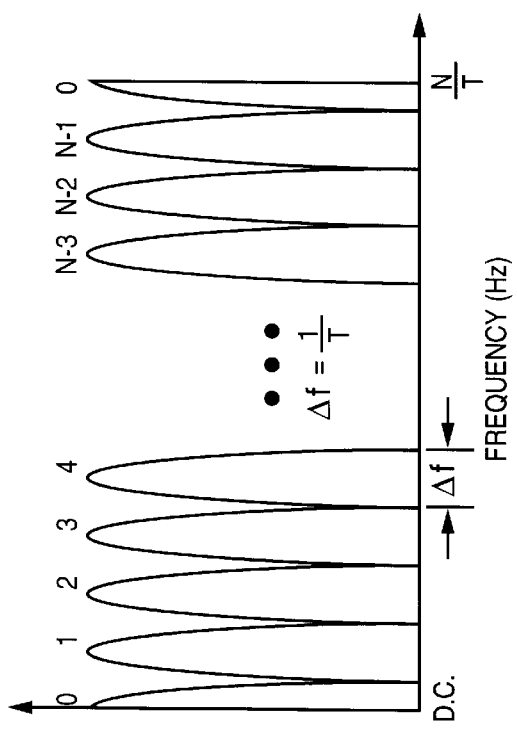
FIG. 2 is a diagram conceptually illustrating frequency domain discrete multitone modulation (DMT)
Figure 3:
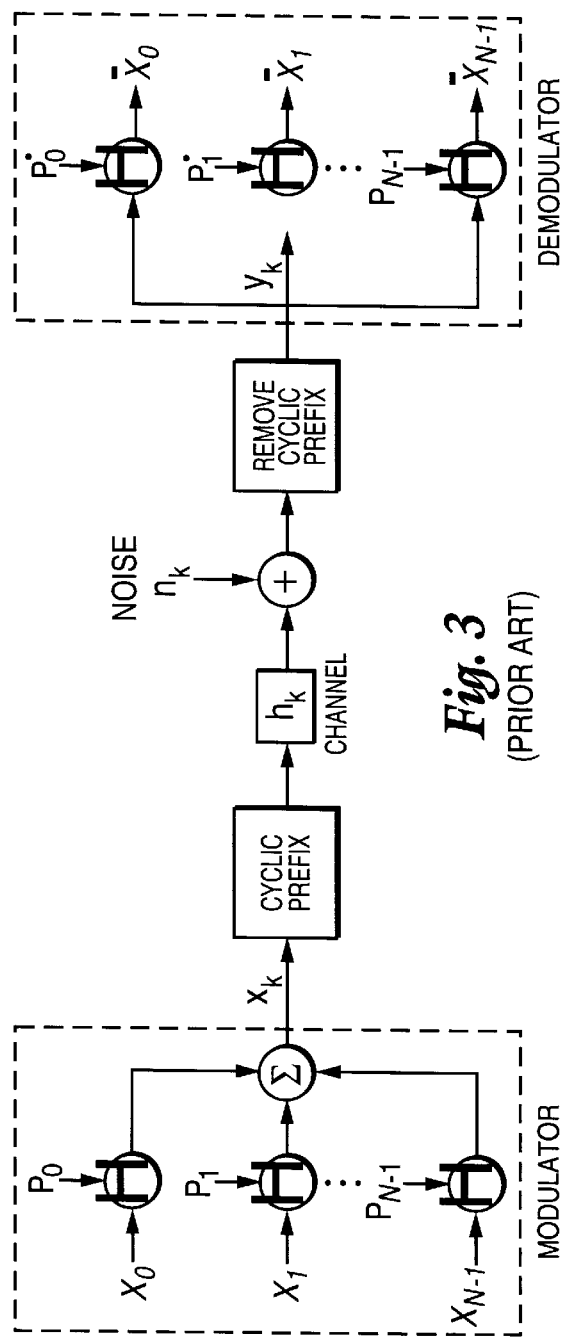
FIG. 3 is a diagram schematically depicting the basic structure of a discrete multitone modulation system.
Figure 4:
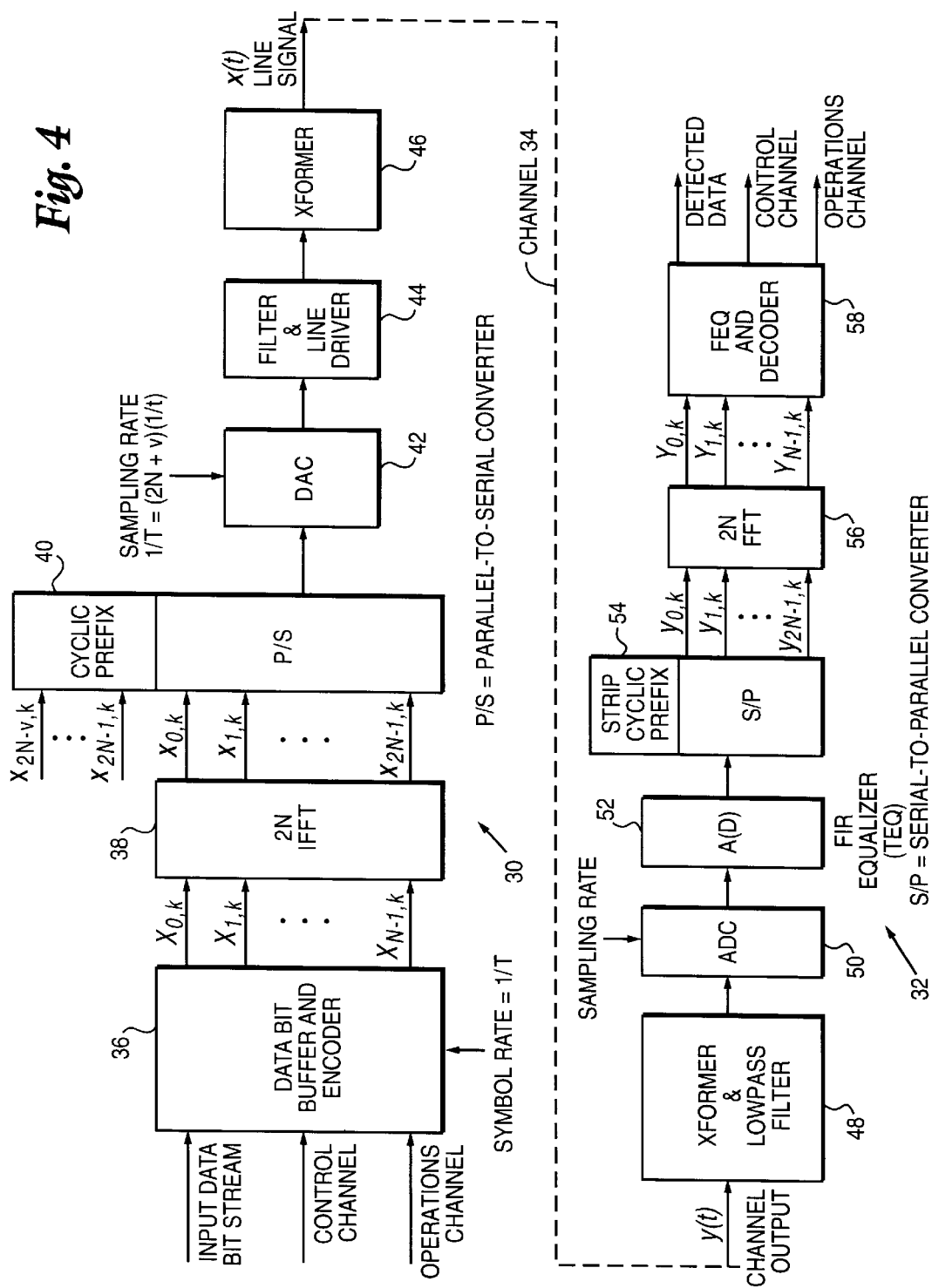
FIG. 4 is a block diagram depicting the principal components of a discrete multitone (DMT) modulation communication system.
Figure 5:
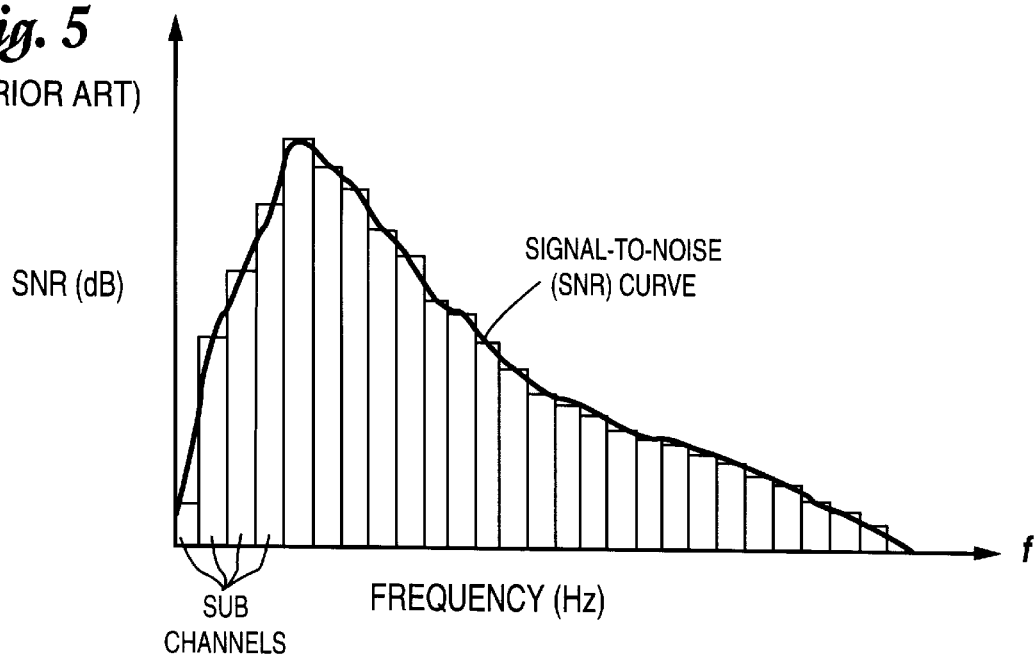
FIG. 5 illustrates DMT bit allocation in the frequency domain.
Figure 6:
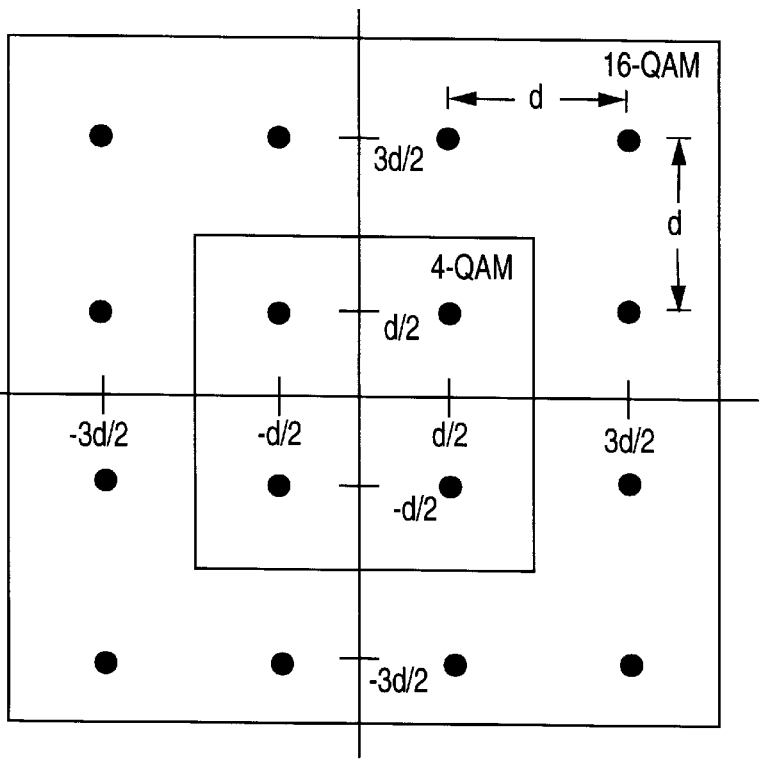
FIG. 6 illustrates two-dimensional 4 and 16 QAM signal constellations.

The example apparatus that may be used in implementing the present invention may include the transmitter and receiver represented by the block diagram of FIG. 4 already described above that in addition includes hardware and/or software for implementing the novel bit allocation procedures according to the present invention. The theoretical foundation for those bit allocation procedures now follows.

Theoretical Foundation

The bitloading procedures in accordance with the invention allocates bits to be transmitted in such a way that each subchannel satisfies the demands on probability of a symbol error, $P_M$, within a system performance margin. This bit allocation is based on a noise variance, $\sigma^2$, in each subchannel and prior knowledge of the average energy in each subchannel signal constellation, $\epsilon_{av}$, which together effectively provide the signal-to-noise ratio SNR for each subchannel. Any additional safeguard margin of bits is distributed evenly among the subchannels.

According to J. G. Proakis, (1995), Digital Communications $3^{rd}$ edition, McGraw-Hill, New York, the symbol error probability PM for a rectangular constellation in Additive White Gaussian Noise (AWGN) is tightly upper bounded by:

$$P_M \leq 4Q\left(\sqrt{\frac{3\varepsilon_{av}}{(M-1)N_0}}\right) \quad (5)$$

where a number of constellation points M per subchannel is defined as $M=2^b$; $b=1,2,\ldots,b_{max}$ is the number of bits conveyed per each signal point in the constellation; $\epsilon_{av}$ is the average energy of the subchannel constellation and is a known design parameter set for each subchannel constellation; and $N_0$ is the single-sided power spectral density of the noise for a received signal constellation point (at the receiver) and is defined as $N_0=2\sigma^2$, where $\sigma^2$ is the received noise variance per real/imaginary dimension. The noise variance can be visualized (in a simplified manner) as the variance of the symbol error, i.e., between the signal point received and the closest constellation signal point in the complex plane.

The Q-function in equation (5) relates the signal-to-noise ratio (roughly defined as $\epsilon_{av}/N_0$) to the symbol error $P_M$ for a particular constellation size and is defined mathematically as:

$$Q(x) = \frac{1}{\sqrt{2\pi}} \int_x^\infty e^{\frac{-u^2}{2}} du \qquad (6)$$

where u is the integral variable. In other words, the Q-function of a certain value x is calculated by solving the integral between the limits x and infinity.

Even though $P_M$ and BER are not identical, this analysis assumes that the symbol error probability and bit error rate (BER) are approximately the same because one symbol usually corresponds to one or more bits. Certain symbol encoding techniques, (i.e., Gray coding where adjacent symbols containing the most likely errors only differ by one bit), may be employed to ensure that the bit error probability and the symbol error probability are very similar.

In most practical applications, the bit error rate (and in this application the symbol error rate $P_M$) is a known system design constraint. To achieve the same BER (or $P_M$) for all subchannel signal constellations and thereby optimally allocate bits to each subchannel under a constraint that the average energy of all subchannel constellations is the same, the denominator of equation (5), $(M-1) N_0$ must be maintained constant, i.e., $$(M-1)N_0 = 2\sigma^2(2^b-1) = C \qquad (7)$$

The constant C depends on the specific BER to be achieved and may be calculated according to:

$$C = 3\varepsilon_{av}\left[Q^{-1}\left(\frac{P_M}{4}\right)\right]^{-2} \qquad (8)$$

Solving equation (7) for the number of bits to be allocated, b, provides the number of bits that may be assigned to a subchannel given a certain BER and the noise variance $\sigma_k^2$ on that particular subchannel, i.e., the bit allocation for each subchannel k corresponding to $b_k$:

$$b_k = \log_2\left(1 + \frac{C}{2\sigma_k^2}\right) \qquad (9)$$

where $\sigma_k^2$ is the noise variance per real (I) and imaginary (Q) dimension on subchannel k. In a preferred implementation, the bit loading values are limited to integer constellations, e.g., by rounding them to integer constellation sizes which affects the total number of allocated bits.

In equation (7), both $\sigma$ and b may vary. The subchannel noise variance $\sigma_k^2$ because of changing noise on the subchannel. Therefore, the number of bits $b_k$ allocated to that subchannel must be varied to compensate for the subchannel noise changes to ensure that equation (7) is satisfied as a constant and equal to C. If the subchannel noise variance $\sigma_k^2$ increases, $b_k$ must decrease, and fewer bits are sent over the subchannel. If $\sigma_k^2$ decreases, $b_k$ can be increased with more bits being sent.

As already described, for a particular system design, the parameters $P_M$ or BER, Q, and $\epsilon_{av}$ are preset/known. Therefore, only the noise variance $\sigma^2$ needs to be determined for each subchannel to solve for the optimal bit allocation per subchannel according to equation (9). To obtain the subchannel noise variance $\sigma_k^2$, the noise standard deviation $\sigma_k$ is determined based on a series of error measurements for symbols received on the subchannel. The subchannel noise standard deviation $\sigma_k$ is the input to the bit loading procedures employed in the present invention and corresponds to the mean of the received symbol error magnitude (attributed to noise) for each subchannel.

The following described how the noise standard deviation estimate $\sigma_k$ may be determined for each subchannel k. The received symbol error is the vector difference between a received signal point and the closest signal constellation point for a particular subchannel. Thus, the received symbol error is a complex number. To estimate the deviation of the error, either the real (I) or the imaginary (Q) part of the received symbol error may be estimated for a theoretical ideal channel with truly Additive White Gaussian Noise (AWGN) because the I and Q components would have equal variance, i.e., the actually received signal points would be equally distributed in a circular pattern around the signal constellation point. In reality, the noise variance may be different in the I and Q dimensions, i.e., not a circular pattern, resulting in poor noise deviation estimates if noise in only one of the two dimensions is measured.

Thus, it is preferred that the noise magnitudes in both the I and Q dimensions be estimated. The received symbol error magnitude can be expressed as:

$$R = \sqrt{X_1^2 + X_2^2} \qquad (10)$$

where $X_1$ and $X_2$ are zero-mean, statistically-independent, gaussian-random variables, each having a variance $\sigma^2$ corresponding to the noise components in the complex I- and Q-dimensions. According to J. G. Proakis, (1995), Digital Communications $3^{rd}$ edition, McGraw-Hill, New York, the random variable R is Rayleigh distributed with an expected (E) mean value:

$$\hat{\sigma} = E(R) = \sqrt{\frac{\pi}{2}} \cdot \sigma \qquad (11)$$

From equation (11), the measured noise standard deviation estimate $\hat{\sigma}_k$ for each subchannel is preferably corrected using E(R), i.e., by dividing the measured $\hat{\sigma}_k$ by $\sqrt{\pi/2}$, in order to obtain the true value of $\sigma_k$.

Example Embodiment of Subchannel Bit Allocation Procedures

The subchannel bit allocation procedures in accordance with the present invention take as an input vector the corrected noise standard deviation estimate $\sigma_k$ for each subchannel k. As described above, the main goal in optimally allocating bits is to maintain a constant, predetermined symbol error probability $P_M$/BER across each of the subchannels. Towards that goal, the invention uses thresholding to make initial bit assignments rather than using conventional complicated numerical computations. Further simplification is achieved by ending bit allocation optimization efforts after a target $P_M$/BER is obtained. In another example embodiment, the preferred bit allocation procedures includes three basic steps that each converge within a finite amount of time.

Thresholding

A corrected, standard deviation of the noise $\sigma_k$ for each subchannel k is estimated using a number of consecutively received symbols as described above in conjunction with equations (10) and (11). A maximum number of bits to be allocated for each subchannel is then determined by comparing the estimated noise standard deviation $\sigma_k$, measured for each subchannel k to a series of thresholds $\tau$ previously calculated and stored for each subchannel. Thus, rather than having to perform the complicated calculations in equations (8) and (9) including logarithms, exponentials, multiplications, etc., the present invention simply compares the estimated noise value measured for each subchannel to a number of thresholds.

The thresholds themselves are calculated only once, (e.g., off-line at a factory), and are subsequently used to establish a correspondence between a subchannel noise standard deviation value $\sigma_k$, and a number of allocated bits $b_k$ for that subchannel. In other words, when the subchannel noise standard deviation value exceeds a certain limit, the number of bits allocated to that subchannel changes. The subchannel thresholds $\tau$ are obtained by solving equation (7) for $\sigma$ and inserting equation (8) which yields:

$$\tau(q) = \sqrt{\frac{3\varepsilon_{av}\left[Q^{-1}\left(\frac{P_M}{4}\right)\right]^{-2}}{2(2^q - 1)}} \quad (12)$$

where q signifies the discrete values at which the subchannel signal constellation size changes. In effect, the subchannel constellation size changes with the measured subchannel noise to maintain a constant BER. The thresholds define the values of measured subchannel noise standard deviation $\sigma_k$ where the constellation size changes as given by:

$$q = \frac{1}{2}, \frac{3}{2}, \ldots, b_{max} - \frac{1}{2} \quad (13)$$

where $b_{max}$ is the maximum number of bits to be transmitted per subchannel, e.g., a maximum number of 12 bits. Once the thresholds are determined (preferably off-line) using equations (12) and (13) and the known values $\varepsilon_{av}$, and $P_M$ and the function Q(x) for each subchannel, they are stored in memory along with a corresponding number of bits associated with each threshold.

If the measured subchannel noise is so strong that not even the smallest constellation may be transmitted with the required bit error rate, that channel is not used, resulting in a zero bit allocation. Any subchannel with a bit allocation of zero reduces the number of active subchannels by one.

The thresholding process is very simple compared to the complex calculations required by conventional bit loading algorithms. The thresholds are calculated following equations (12) and (13) and stored in memory. The received symbol mean error magnitude is measured for each subchannel and used as an estimate of the subchannel noise standard deviation $\sigma_k$. The subchannel bit allocation $b_k$ is associated to an interval between the two thresholds in which the value of the noise standard deviation estimate $\sigma_k$ falls. The thresholding/comparison may be implemented in software using a rudimentary data processor, or preferably in relatively simply hardware to increase operational speed.

Figure 7:
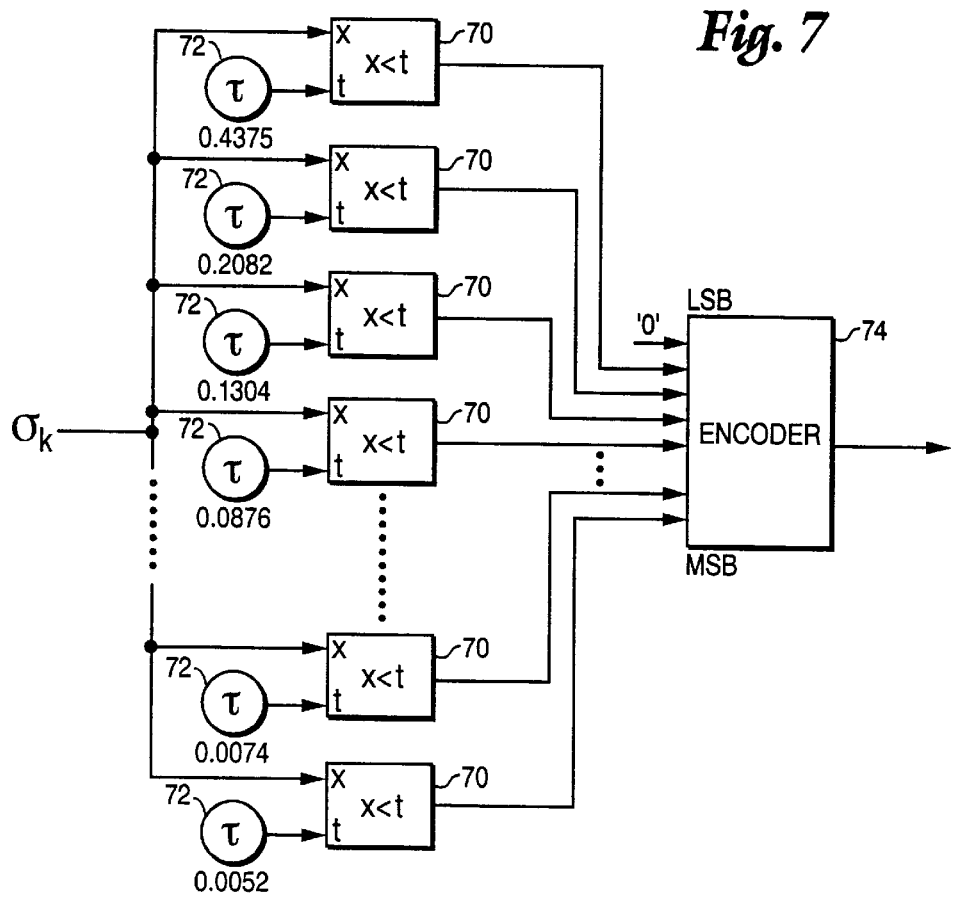
FIG. 7 shows one example configuration implementing the thresholding operation and bit allocation procedures in accordance with one example embodiment of the present invention.

FIG. 7 is block diagram illustrating the thresholding operation. The measured subchannel noise standard deviation $\sigma_k$ is input to a bank of parallel comparators 70. The other input of each comparator 70 is one of a number of subchannel thresholds $\tau$ calculated in accordance with equation (12) for different values of q as indicated in equation (13). In an example embodiment where $b_{max}$ is 12, there are twelve comparators 70 and twelve different stored threshold values $\tau_1$–$\tau_{12}$ 72. The combined outputs of each comparator 70 make up a "bit vector" that is input to an encoder 74. The least significant bit (LSB) of the bit vector is fixed to zero. In each comparator 70, if the input noise deviation $\sigma_k$ is less than the specific threshold value $\tau$, the comparator 70 generates a logical "1" at its output. Alternatively, if the input value is greater than the threshold, the comparator 70 generates a logical "0" at its output.

As illustrated in FIG. 8, the least significant bit in the comparator input bit vector supplied to the encoder 74 is in the zero position, and the encoder 74 outputs a zero if the bit vector contains only zeros. In effect, the specific comparator whose input threshold is first exceeded by the input noise standard deviation $\sigma_k$ determines the number of bits indicated by encoder 74 to be allocated to that subchannel. In the case shown in FIG. 8, the smaller the noise standard deviation value, the larger the number of bits that may be allocated to the subchannel.

Figure 9:
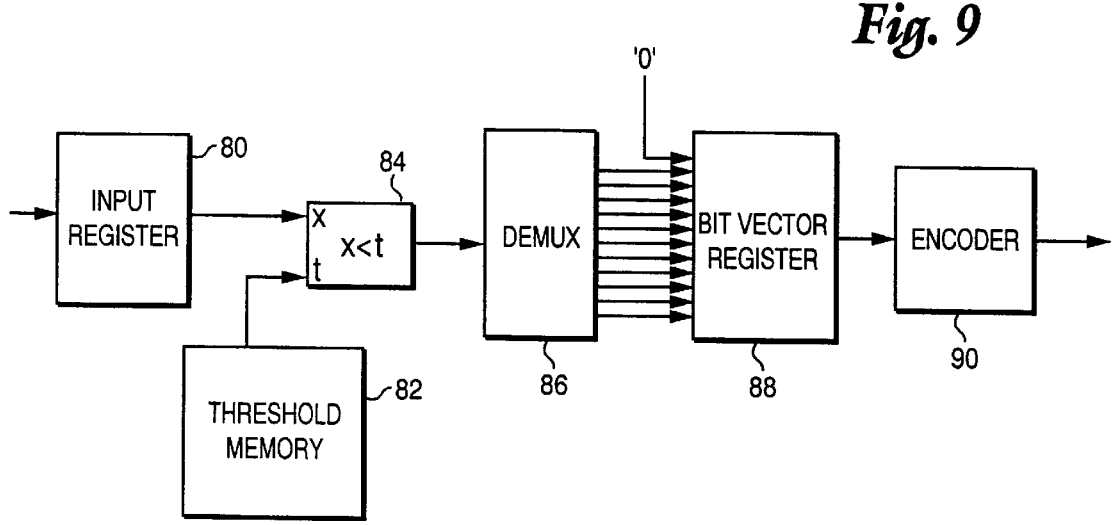
FIG. 9 shows an alternative example configuration for implementing the thresholding and bit allocation operations in accordance with the present invention.

Of course, the thresholding operation illustrated in FIGS. 7 and 8 is only an example. Another example implementation is shown in FIG. 9 where a single comparison device 84 is used. The measured noise standard deviation $\sigma_k$ for a subchannel is stored in an input register 80 and input to a comparator 84. Digital threshold values $\tau$ calculated for this subchannel are stored in threshold memory 82 and are sequentially input to the digital comparator 84. The resulting sequential comparator outputs are passed through a demultiplexer in order to write different positions in the bit vector register 88. The encoder 90 analyzes the bit vector stored in register 88, and outputs the corresponding number of bits to be allocated for that subchannel based upon the thresholding comparison operation.

If the total number of bits allocated to all subchannels in the thresholding step is less than the target number of bits, the desired bit rate cannot be achieved while maintaining the prescribed bit error rate because of increased noise or other factors. Consequently, the data transmission rate or the BER performance must be reduced. A decrease in transmission rate means allocating a fewer number of bits to each subchannel. Alternatively, another set of thresholds $\tau$ corresponding to a higher BER may be employed. Thus, several sets of threshold values for different BERs may be calculated using equations (12) and (13) and stored in memory. However, the former decrease in transmission rate/allocated bits is preferred.

Block Reduction

If the total number of bits allocated across all subchannels exceeds the target number of bits, excess bits may be allocated to the active subchannels such that the data transmission rate can exceed the required data rate and still fulfill the prescribed bit error rate. If that goal is desired, the bit allocation procedures may end here. However, further bit allocation refinements may also be desirable. For example, the transmitted bit rate may be reduced to the prescribed bit rate to achieve certainty as well as an extra immunity to noise.

If such further refinement is desired, a decision is made if the total number of allocated bits exceeds the target number of bits by more than the current number of active subchannels, i.e., subchannels that have not been set to zero. If so, one bit is subtracted from the initially allocated number of bits to be transmitted on each active subchannel. Of course, any subchannels that have zero bit allocations reduces the number of used subchannels by one.

This "block reduction" step is repeated until the number of allocated bits in excess of the overall target number of bits is less than the number of active subchannels k. The reduced number of allocated bits corresponds to a lower overall transmission rate with the margin evenly distributed among the subchannels.

Fine Correction

A further fine correction step may be employed to compensate for the difference between the number of bits remaining to be allocated and the target number of bits after the block reduction step is completed. For each active subchannel, the relation between the estimated noise standard deviation $\sigma_k$ and the threshold of its subchannel constellation is calculated as:

$$d_k = \log_2\left(\frac{\sigma_2}{thr(b_k)}\right) = \log_2(\sigma_k) - \log_2(thr(b_k)) \quad (14)$$

where thr[$b_k$] signifies the operation of comparing the noise standard deviation $\sigma_k$ of subchannel k to the precalculated thresholds for that subchannel. The distance $d_k$ represents the difference between the noise standard deviation value $\sigma_k$ and the associated threshold $\tau$ where the bitloading value changes. The subchannel having the largest distance is the first subchannel to have a bit removed from the groups of allocated bits.

Because bits are subtracted from subchannels with the largest distance $d_k$, the subchannel most sensitive to noise in its present constellation is advantageously reduced first. If the bit allocation of a subchannel that is not the most sensitive to noise is reduced, its immunity to noise is boosted. Unfortunately, the most sensitive subchannel remains unchanged thereby becoming the "weakest link". The distance calculation ensures that the weakest links are the first to have bits removed then a relatively strong subchannel.

This task may take more or less time consuming depending on the total number of subchannels to be reduced and on the choice of sorting algorithm. For example, assume there are 1024 subchannels and that after the block reduction step there are an excess of 1023 bits allocated, i.e., 1023 bits more than the targeted number. The task then is to reduce 1023 in order of "largest distance first" by finding the 1023 largest elements in the distance vector. If, on the other hand, there is an excess of only 10 bits, only the 10 largest elements in the distance vector need be found which takes less time. The sorting algorithm which sorts the distance vector elements from largest to smallest also affects this process. A fast sorting algorithm may be more complex to implement, require a sophisticated microprocessor, etc.

Figure 10:
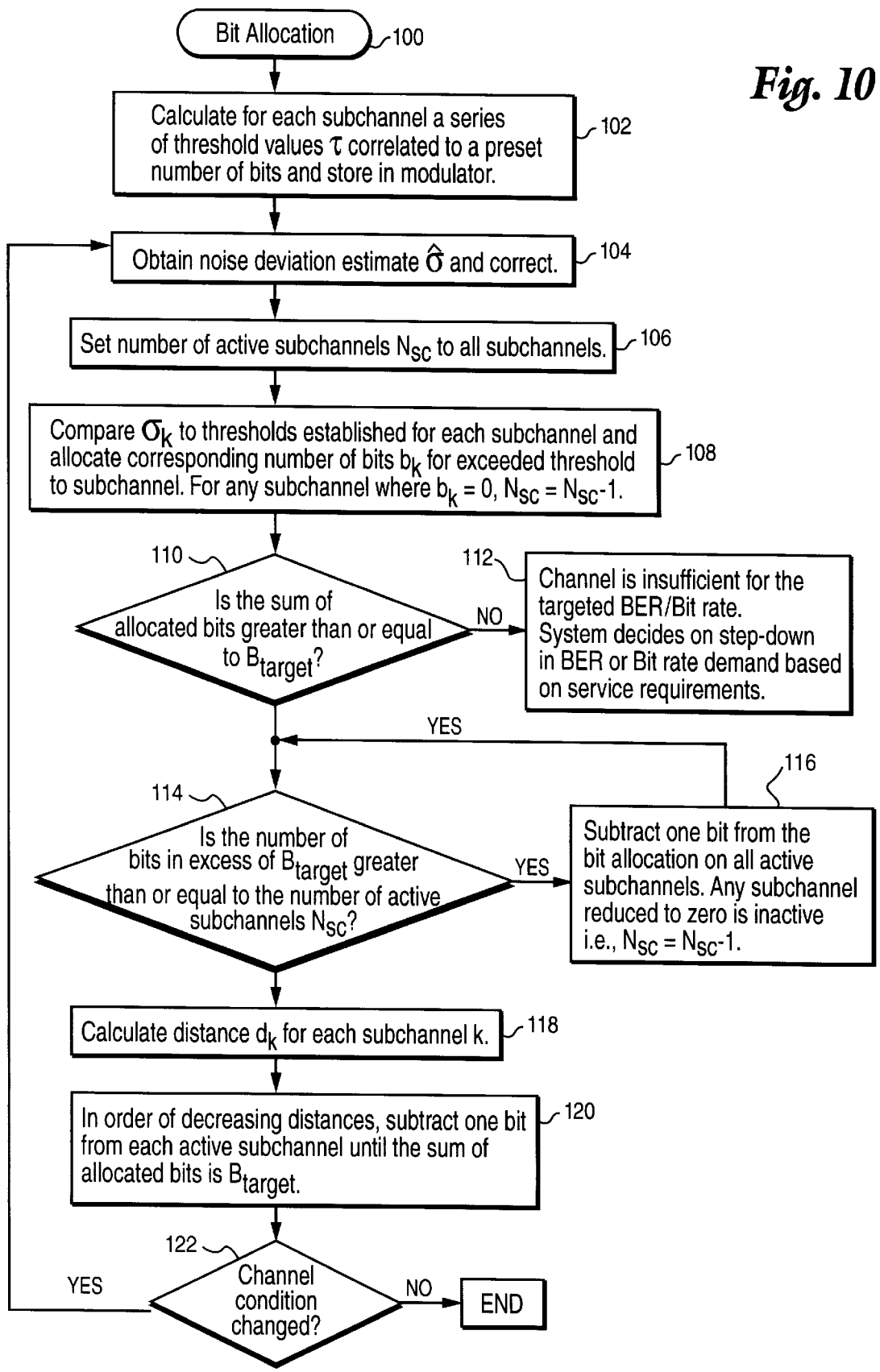
FIG. 10 illustrates bit loading procedures in flowchart form in accordance with the present invention.

A flow chart diagram outlining example procedures for implementing the thresholding, block reduction, and fine correction steps is now described in conjunction with the bit allocation routine (block 100) illustrated in FIG. 10. An initial series of operations is performed usually at the time the device incorporating the present invention, such as a modem, is being manufactured. More specifically, a series of threshold values $\tau(q)$ is calculated for each subchannel in accordance with equations 12 and 13 (block 102). In addition, each threshold value is correlated to a preset number of bits to be allocated for that subchannel. The threshold values and correlated numbers of bits are then stored. As mentioned above, different sets of threshold values corresponding to bit allocations may be calculated for several different bit/symbol error rates. The calculations and procedures performed in block 102 are generally performed only once.

In terms of determining the actual number of bits to be allocated for each subchannel, the noise deviation estimate $\hat{\sigma}_k$ is measured for each subchannel and corrected in accordance with equation (11) (block 104). In a preferred embodiment, the actual correction factor is incorporated in the one time threshold calculation process in block 102 since the correction factor is known. In addition, the number of active subchannels $N_{sc}$ is set to all of the subchannels (block 106).

The noise standard deviation estimate for each subchannel $\sigma_k$ is compared to the thresholds $\tau$ predetermined for each subchannel from smallest to largest magnitude. When the noise standard deviation first exceeds one of the thresholds, the stored number of bits $b_k$ corresponding to that first exceeded threshold is allocated to that subchannel (block 108). For any subchannel where no bits can be allocated, the subchannel is deemed to be inactive, and the number of active subchannels $N_{sc}$ is decremented.

A decision is made whether the sum of the bits allocated to all of the subchannels is greater than or equal to a target number of bits $B_{target}$ (block 110). If not, the current channel conditions will not provide the targeted data bit rate at the targeted bit error rate. A decision must be made then to decide whether to change the bit error rate requirements or the bit transmission rate requirements (block 112). Depending upon whether such reduced service requirements are acceptable, control may return to block 102 or block 104.

On the other hand, if the total number of bits allocated across all subchannels is greater than the target number of bits, another decision is made whether the number of bits that can be allocated to the subchannels in excess of the target number of bits exceeds or is equal to the number of active subchannels (block 114). If so, one bit may be subtracted from the number of bits currently allocated to each active subchannel (block 116). Any subchannel whose group of allocated bits is reduced to zero after the subtraction operation causes a decrementing of the number of active subchannels $N_{sc}$. This is an iterative process with control returning to decision block 114 via the shown feedback path.

When the number of allocated bits in excess of the target number is less than the number of active subchannels $N_{sc}$, the distance $d_k$ for each subchannel k is determined in accordance with equation (14) (block 118). In order of decreasing distance values for each subchannel k, one bit is subtracted from each active subchannel until the sum of the allocated bits equals the target number of bits (block 120).

While the present method may be performed under relatively static channel conditions, it may also be advantageously employed in dynamic channel conditions. For example, the noise on a particular subchannel may change over time. Accordingly, an inquiry is made in decision block 122 whether a subchannel condition has changed. If not, continued periodic inquiries may be made or the method may simply end. However, if the subchannel has changed, control returns to block 104 to obtain the updated noise deviation estimate for one or more subchannels affected by the condition change, and the method repeats.

The present invention may, of course, be applied to any telecommunications application that employs multi-carrier type modulation, e.g., DMT, etc. Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a multi-carrier communications system with a transmitter and a receiver linked together by a communications channel affected by noise or other varying channel impairments where data bits to be transmitted over the channel at a prescribed data transmission rate and bit error rate are allocated to plural subchannels, a method comprising the steps of:

calculating for each subchannel a series of thresholds corresponding to a preset number of bits to be allocated to the subchannel;

obtaining an error estimate on each subchannel;

comparing the error estimate for each subchannel to the thresholds calculated for the subchannel; and allocating a number of bits to each subchannel corresponding to one of the thresholds exceeded by the error estimates, wherein the calculating step is performed once and the obtaining, comparing, and allocating steps are performed for an initial condition of the channel and in real time when the channel condition changes.

2. The method in claim 1, wherein the error estimate is a noise standard deviation measured for each subchannel.

3. The method in claim 2, wherein the noise standard deviation is corrected for nonuniform characteristics.

4. The method in claim 1, wherein each subchannel is associated with a signal constellation where bits allocated to the subchannel are mapped to signal points in the signal constellation, and wherein the subchannel thresholds are calculated based on the prescribed bit error rate, an average energy of the subchannel signal constellation, and the signal constellation size.

5. The method in claim 1, further comprising:

determining whether a total number of bits allocated to all of the subchannels is greater than or equal to a total target number of bits associated with the prescribed data transmission rate.

6. The method in claim 5, further comprising:

if the total number of allocated bits is less than the total target number of bits, reducing the prescribed data transmission rate or increasing the prescribed bit error rate.

7. The method of claim 5, further comprising:

if the total number of allocated bits is greater than or equal to the total target number of bits, reducing the number of bits allocated to one or more of the subchannels until the total number of allocated bits is nearly equal to the total target number of bits.

8. In a multi-carrier communications system with a transmitter and a receiver linked together by a communications channel affected by noise or other varying channel impairments where data bits to be transmitted over the channel at a prescribed transmission rate and bit error rate are allocated to plural subchannels, a method comprising the steps of:

obtaining an error estimate of each subchannel;

comparing the error estimate for each subchannel to a series of thresholds corresponding to a preset number of bits to be allocated to the subchannel;

allocating a number of bits to each subchannel corresponding to one of the thresholds exceeded by the error estimate; and when a total number of bits allocated to all of the subchannels is in excess of a total target number of bits associated with the prescribed data transmission rate, determining an active number of subchannels having at least one allocated bit and if the excess number of bits exceeds the active number of subchannels, reducing the number of bits to be allocated to each active subchannel by one bit until the excess number of bits is less than the number of active subchannels.

9. The method in claim 8, further comprising:

when a remainder of the excess number of bits is less than the number of active subchannels, further reducing the reminder by reducing the number of bits allocated to a selected one of the active subchannels.

10. The method in claim 9, wherein the one active subchannel is selected based on a magnitude of a difference between the error estimate and the exceeded threshold for each active subchannel, the active subchannel having the largest difference magnitude being selected as the one active subchannel.

11. The method in claim 10, the further reducing step further comprising:

subtracting one bit from each active subchannel in order of decreasing magnitude difference.

12. The method in claim 8, repeating the steps in claim 8 when a condition of the channel changes.

13. The method in claim 12, wherein the steps in claim 8 are repeated in real time.

14. The method in claim 8, wherein the error estimate is a noise standard deviation measured for each subchannel.

15. The method in claim 14, wherein the noise standard deviation is corrected for nonuniform characteristics.

16. The method in claim 8, wherein each subchannel is associated with a signal constellation where bits allocated to the subchannel are encoded to signal points in the signal constellation, and wherein the subchannel thresholds are predetermined based on the prescribed bit error rate, an average energy of the subchannel signal constellation, and the signal constellation size.

17. A multi-carrier communications system comprising:

a transmitter and a receiver linked together by a communications channel affected by noise or other varying channel impairments where data bits to be transmitted over the channel at a prescribed data transmission rate and bit error rate are allocated to plural subchannels; and electronic circuitry configured to perform the following tasks:

comparing an error estimate for each subchannel to a series of thresholds corresponding to a preset number of bits to be allocated to the subchannel;

allocating a number of bits to each subchannel corresponding to one of the thresholds exceeded by the error estimate;

determining an active number of subchannels having at least one allocated bit; and if a total number of bits allocated to all of the subchannels exceeds a total target number of bits by the active number of subchannels or more, reducing the number of bits to be allocated to each active subchannel by one bit until the excess number of bits is less than the number of active subchannels.

18. The multi-carrier communication system according to claim 17, wherein the thresholds are calculated only once and the comparing and allocating tasks are performed when the channel condition changes.

19. The multi-carrier communication system according to claim 17, wherein the error estimate is a noise standard deviation measured for each subchannel.

20. The multi-carrier communication system according to claim 19, wherein the noise standard deviation is corrected for nonuniform characteristics.

21. The multi-carrier communication system according to claim 17, wherein each subchannel is associated with a signal constellation where bits allocated to the subchannel are encoded to signal points in the signal constellation, and wherein the subchannel thresholds are calculated based on the prescribed bit error rate, an average energy of the subchannel signal constellation, and the signal constellation size.

22. The multi-carrier communication system according to claim 17, wherein the electronic circuitry determines whether a total number of bits allocated to all of the subchannels is greater than or equal to a total target number of bits associated with the prescribed data transmission rate.

23. The multi-carrier communication system according to claim 22, wherein if the total number of allocated bits is less than the total target number of bits, the electronic circuitry reduces the prescribed data transmission rate or increases the prescribed bit error rate.

24. The multi-carrier communication system according to claim 22, wherein if the total number of allocated bits is greater than or equal to the total target number of bits, the electronic circuitry reduces the number of bits allocated to one or more of the subchannels until the total number of allocated bits is nearly equal to the total target number of bits.

25. The multi-carrier communication system according to claim 17, wherein when a remainder of the excess number of bits is less than the number of active subchannels, the electron circuitry further reducing the remainder by reducing the number of bits allocated to a selected one of the active subchannels.

26. The multi-carrier communication system according to claim 25, wherein the one active subchannel is selected based on a magnitude of a difference between the error estimate and the exceeded threshold for each active subchannel, the active subchannel having the largest difference magnitude being selected as the one active subchannel.

27. The multi-carrier communication system according to claim 17, wherein the electronic circuitry implements the tasks using a programmed data processor.

28. The multi-carrier communication system according to claim 17, wherein the electronic circuitry implements the tasks using discrete hardware elements.

29. A multi-carrier communications system comprising:

a transmitter and a receiver linked together by a communications channel affected by noise and other varying channel impairments where data bits to be transmitted over the channel at a prescribed data transmission rate and bit error rate are allocated to plural subchannels; and electronic circuitry configured to perform the following tasks:

comparing an error estimate for each subchannel to a series of thresholds corresponding to a preset number of bits to be allocated to the subchannel, and allocating a number of bits to each subchannel corresponding to one of the thresholds exceeded by the error estimate, wherein the electronic circuitry subtracts one bit from each active one of the plural subchannels in order of decreasing magnitude difference.

\* \* \* \* \*